US009928503B2

(12) United States Patent
Leeds et al.

(10) Patent No.: US 9,928,503 B2
(45) Date of Patent: Mar. 27, 2018

(54) SYSTEM AND METHOD FOR COMMUNICATING PURCHASES RELATED TO A GIFT CARD CREDIT

(75) Inventors: David Leeds, Seattle, WA (US); Jacob Waechter, Gig Harbor, WA (US); Christian Hansson, Port Orchard, WA (US)

(73) Assignee: Tango Card, Inc., Seattle, WA (US)

( * ) Notice: Subject to any disclaimer, the term of this patent is extended or adjusted under 35 U.S.C. 154(b) by 0 days.

(21) Appl. No.: 13/481,768

(22) Filed: May 25, 2012

(65) Prior Publication Data
US 2013/0317926 A1 Nov. 28, 2013

(51) Int. Cl.
G06Q 20/00 (2012.01)
G06Q 20/34 (2012.01)
G06Q 20/32 (2012.01)
G06Q 20/40 (2012.01)
G06Q 30/06 (2012.01)
G06Q 20/20 (2012.01)
G07F 7/08 (2006.01)

(52) U.S. Cl.
CPC ......... *G06Q 20/342* (2013.01); *G06Q 20/20* (2013.01); *G06Q 20/202* (2013.01); *G06Q 20/322* (2013.01); *G06Q 20/40* (2013.01); *G06Q 30/06* (2013.01); *G07F 7/0846* (2013.01)

(58) Field of Classification Search
CPC ...... G06Q 20/202; G06Q 20/20; G06Q 20/40; G06Q 20/322; G06Q 20/3278
USPC .......................................................... 705/21
See application file for complete search history.

(56) References Cited

U.S. PATENT DOCUMENTS

| 2002/0042742 | A1 | 4/2002 | Glover et al. | |
| 2002/0072968 | A1 | 6/2002 | Gorelick et al. | |
| 2002/0116257 | A1 | 8/2002 | Helbig | |
| 2003/0200142 | A1 | 10/2003 | Hicks et al. | |
| 2005/0216354 | A1* | 9/2005 | Bam et al. | 705/26 |
| 2005/0275870 | A1* | 12/2005 | Elarde et al. | 358/1.15 |
| 2009/0276305 | A1 | 11/2009 | Clopp | |

(Continued)

OTHER PUBLICATIONS

Snyder, Jaime. Image-Enabled Discourse: Investigating the creation of visual information as communicative practice. Syracuse University, ProQuest Dissertations Publishing, 2012.*

Primary Examiner — Florian M Zeender
Assistant Examiner — Fawaad Haider
(74) Attorney, Agent, or Firm — Morgan, Lewis & Bockius LLP

(57) ABSTRACT

A method and system are provided for communicating digitized data associated with a purchase made by expenditure of a monetary credit account, such as a gift card account. The digitized data may be or comprise audio, photographic or video data. A gift card may be provided that relates to a monetary credit account that may specify an expendable monetary value, a benefactor who initiated the account, and a beneficiary who may use the monetary card. The gift card may record of at least part of the monetary credit account. The system may enable the generation of an electronic message that includes digitized data representing a purchased item and the message may be communicated to a photo-sharing webservice and/or an address associated with the benefactor. The digitized data may be a photograph, icon or a graphic image and the purchased item may be a service, good, license, lease, rent, or permission.

21 Claims, 17 Drawing Sheets

(56) References Cited

U.S. PATENT DOCUMENTS

2011/0295658 A1* 12/2011 Bastos et al. ................ 705/14.1
2012/0150729 A1   6/2012 Isaacson et al.
2012/0262468 A1* 10/2012 Ronayne ....................... 345/548
2013/0103484 A1   4/2013 McLaughlin
2013/0185166 A1*  7/2013 Larkin ............................. 705/21

* cited by examiner

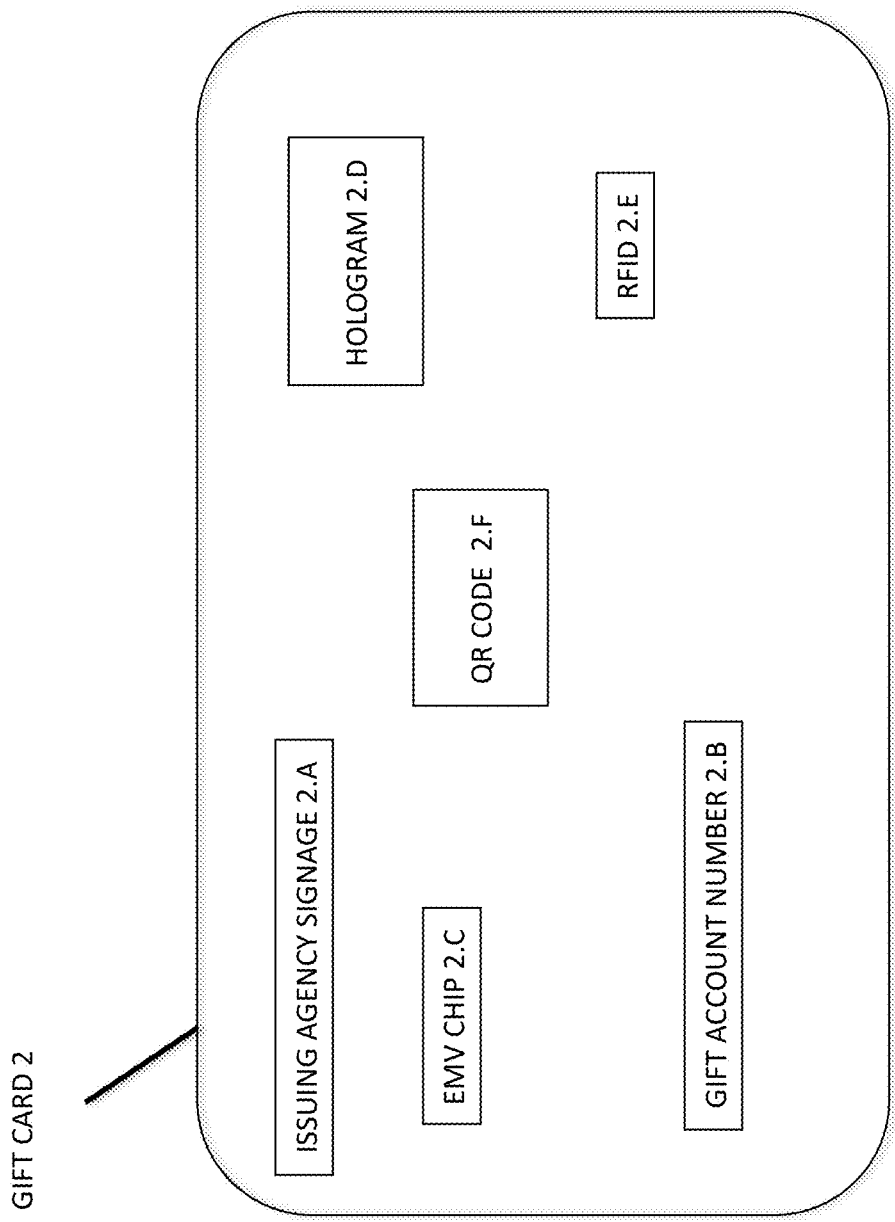

SYSTEM AND METHOD FOR COMMUNICATING PURCHASES RELATED TO A GIFT CARD CREDIT

FIELD OF THE INVENTION

The present invention relates to information technology applied to transfer monetary values. More specifically, but not by way of limitation, embodiments of the present invention relate to redeeming cash from stored-value instruments, debit accounts or credit accounts at points of service in concert with an electronic communications network.

BACKGROUND OF THE INVENTION

Use of stored-value instruments has increased dramatically in recent years. Consumers purchase or otherwise obtain stored-value instruments, often in the form of gift cards, and use a monetary value associated with these instruments to purchase goods or services at associated merchants or as accepted by credit card network participants, such as affiliates of credit card accounts, such as VISA™, MASTER CARD™, DISCOVER™ or AMERICAN EXPRESS™ systems or programs or retail store credit cards or programs offered or associated with retail operators, such as MACYS™, SAKS FIFTH AVENUE, J.C. PENNEY'S™ or the like.

Prior art gift cards provide a restricted monetary equivalent or scrip that is issued by retailers or banks to be used as an alternative to a non-monetary gift. Highly popular, gift cards ranked in year 2006 as the second-most given gift by consumers in the United States and the most-wanted gift by women, and the third-most wanted by males. Gift cards have become increasingly popular partially because their use relieves the benefactor of the gift card of the responsibility of selecting a specific gift. In addition, the gift card process enables a recipient, or beneficiary, of the gift card to expend and associated monetary value at his or her discretion within the restrictions set by the issuing agency.

Gift cards are often purchased and given as gifts by a benefactor who wishes to create or strengthen a personal, social or business relationship with a beneficiary-recipient of the gift card or a gifted monetary value account. Yet the prior art fails to optimally enable or even encourage communication between a benefactor who buys or originates a gift card or gifted monetary account and a beneficiary who receives the gift card or control over a gifted monetary value account.

SUMMARY AND OBJECTS OF INVENTION

It is an object of the invented method to provide a method and a system that enable the association and communication of a sensory representation, to include an auditory representation and/or a visual representation, of an item purchased by a beneficiary of gift card in consideration for the expenditure of a monetary value assigned to the gift card.

Towards these objects and other objects that will be made obvious in light of this disclosure, a system and method are provided for associating a gift card or a purchasing of an item with a sensory representation of the purchased item, wherein the sensory association may include an association with digitized audio data and/or digitized visual, photographic or video data.

It is understood that the purchased item may be a good, a service, or a license, lease, or permission to use or access a good, service, equipment, locale or venue. It is further understood that the sensory representation may be a digitized sound recording, a digitized photograph, a graphics image, an icon, a visual symbol and/or other digitized record of a sensory phenomenon, event or experience.

According to one aspect of the method of the present invention (hereinafter, "the invented method"), a benefactor provides a gift card having an associated monetary value to the beneficiary. The beneficiary may then purchase an item and select a visual representation of the purchased item. The visual representation of the purchased item may be communicated to the benefactor by means of a communications network, such as the Internet or a telephony network, or a computer network in communication with a telephony network. Alternately, the visual representation of the item may be associated with the item by a third party prior to the purchase by the beneficiary, or the visual representation may be assigned or selected by a third party at the time of the performance of the purchase, According to another aspect of the invented method, the visual representation of the purchased item may be selected from a photo sharing service of the World Wide Web or other Internet service. Alternately or additionally, the visual representation of a purchased item may be generated by means of a digital camera, or an electronic device having a digital camera such as a photographically enabled cellular telephone, personal computer, or portable communications device.

According to yet another aspect of the invented, the visual representation of the purchased device may be communicated from a digital camera or a web service and communicated in an electronic message, such as email or an SMS transmission, to a cellular telephone, an email account, a web service, or a photo sharing web-based service.

According to a still other aspect of the invented method, the beneficiary alone is personally authorized to expend the monetary value provided by the benefactor in a transfer of ownership and control of a gift card, a monetary value account associated with the gift card, and/or a monetary value account unassociated with a gift card.

According to yet other optional, additional and/or alternate aspects of the invented method, the beneficiary may expend some or all of the gifted monetary value in an online purchase.

According to even other optional, additional and/or alternate aspects of the invented method, the beneficiary may expend some or all of the gifted monetary value in a purchase performed in whole or in part while the beneficiary or his or her agent is physically present at a point of sale or within a retail sales facility.

According to still other optional additional and/or alternate aspects of the invented method, the beneficiary may expend some or all of the gifted monetary value in a purchase performed in whole or in part by means of an automated telephony system and/or by telephonic voice communications with a retail sales representative.

BRIEF DESCRIPTION OF THE FIGURES

These, and further features of the invention, may be better understood with reference to the accompanying specification and drawings depicting the preferred embodiment, in which:

FIG. 1A is a view of a front side of a gift card;

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1B:
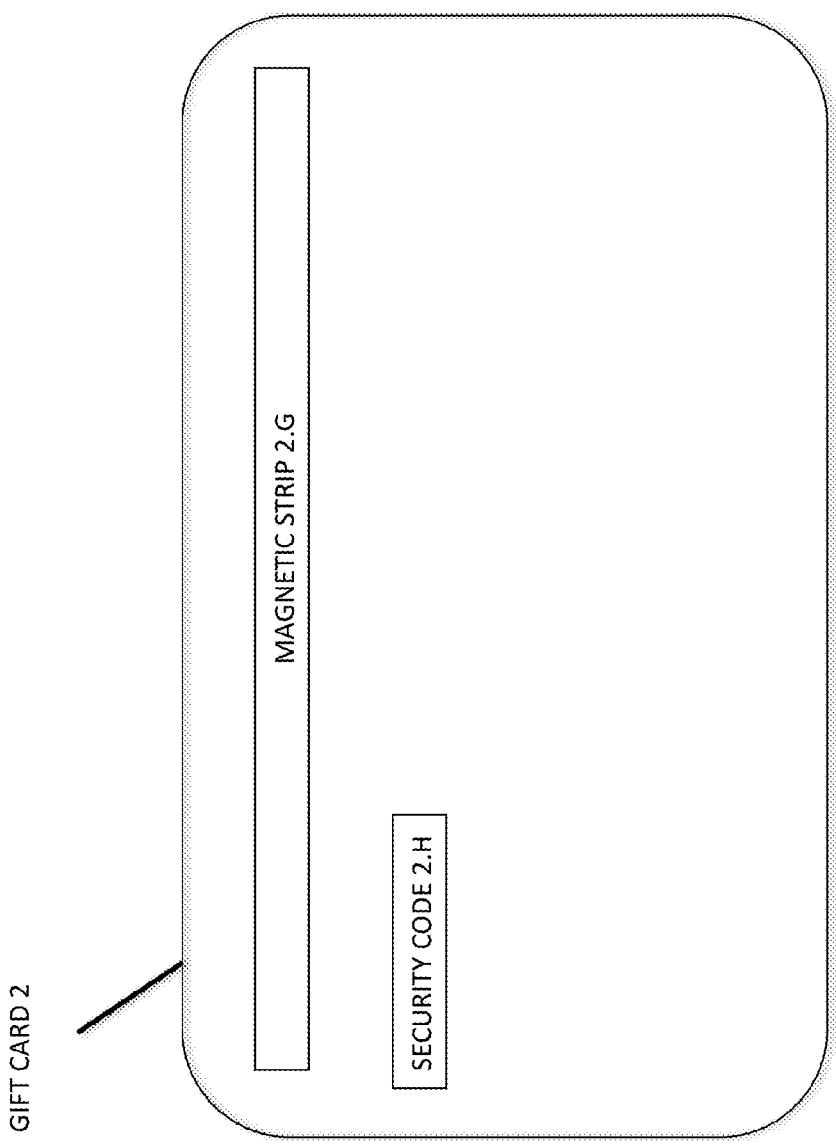
FIG. 1B is a view of a back side of the gift card of FIG. 1A.

Referring now to FIGS. 1A and 1B, FIG. 1A is a front side of a gift card 2 that includes an issuing agency signage 2.A, a gift account number 2.B, an EMV chip 2.C, a hologram image record 2.0, a radio frequency identification device 2.E (hereinafter "RFID" 2.E) and a QUICK RESPONSE™ network address bar code 2.F, or "QR code" 2.F.

FIG. 1B is a view of a backside of the gift card 2 whereupon a magnetic strip 2.G and a security code 2.H are positioned.

Figure 2:
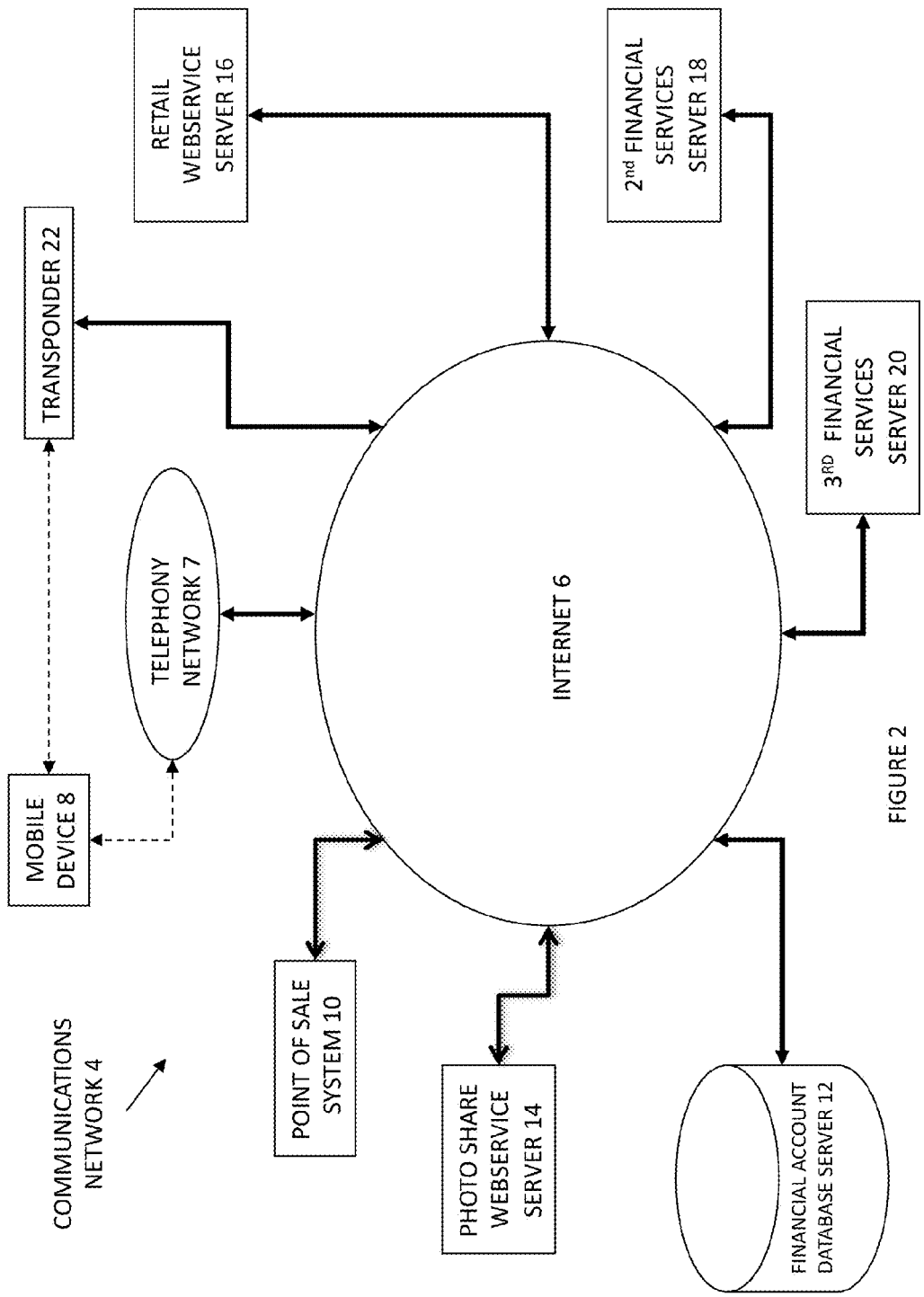
FIG. 2 is a schematic diagram of an electronics communications network that includes a financial account database server, a point of sale system, a retail webservice server, and a mobile device having a digital photographic module.

Referring now to FIG. 2, FIG. 2 is a schematic diagram of an electronics communications network 4 (hereinafter, "the network" 4) that includes the Internet 6, a telephony network 7, a mobile device 8, a point of sale system 10, a financial account database server 12, a photo-share webservice server 14, a retail web service server 16, a plurality of financial services servers 18 & 20 and a transponder 22. The mobile device 8 is preferably (a.) bi-directionally communicatively coupled with both the telephony network 7 and the Internet 6, and (b.) adapted to generate digitized photographic images of purchased items or of images related to purchased items. More particularly, the mobile device 8 may be or comprise (a.) an IPHONE™ cellular telephone as marketed by Apple, Inc. of Cupertino; (b.) an IPAD™ tablet computer adapted for generation of digitized photographic documents and capable of bi-directional communications via the telephony network and the Internet 6 as marketed by Apple, Inc. of Cupertino, Calif.; (c.) an HTC TITAN II™ cellular telephone as marketed by AT&T, Inc. of Dallas, Tex. and running a WINDOWS 7™ operating system as marketed by Microsoft Corporation of Redmond, Wash.; (d) a GALAXY NEXUS™ smart phone as marketed by Samsung Group of Seoul, Republic of Korea and running an ANDROID™ operating system as marketed by Google, Inc. of Mountain View, Calif.; (e.) a TOUGHPAD™ tablet computer as marketed by Panasonic Corporation of Kadoma, Osaka, Japan and running an ANDROID™ operating system as marketed by Google, Inc. of Mountain View, Calif.; or (f.) other suitable computational system or electronic communications device known in the art.

The point of sale system 10 (or "POS system" 10) is preferably adapted for bi-directional communication via the Internet 6, optionally via the telephony network, and is further preferably adapted to generate digitized photographic images of purchased items or of images related to purchased items. The POS system 10 may be or comprise.

(a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f.) an IPHONE™ cellular telephone as marketed by Apple, Inc. of Cupertino, Calif.; (g.) an HTC TITAN II™ cellular telephone as marketed by AT&T, Inc. of Dallas, Tex. and running a WINDOWS 7™ operating system as marketed by Microsoft Corporation of Redmond, Wash.; (h.) a GALAXY NEXUS™ smart phone as marketed by Samsung Group of Seoul, Republic of Korea or and running an ANDROID™; (i.) a TOUGHPAD™ tablet computer as marketed by Panasonic Corporation of Kadoma, Osaka, Japan and running an ANDROID™ operating system as marketed by Google, Inc. of Mountain View, Calif.; or (j.) other suitable computational system or electronic communications device known in the art. capable of providing or enabling a financial webservice known in the art.

The financial account database server 12 (hereinafter "the FAD server" 12) is adapted for bi-directional communication via the Internet 6, and to optionally communicate via the telephony network, and to retain and maintain a plurality of gift card records G.REC.1-G.REC.N of FIG. 2. The FAD server 12 may be or comprise (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f.) an IPHONE™ cellular telephone as marketed by Apple, Inc. of Cupertino, Calif.; (g.) an HTC TITAN II™ cellular telephone as marketed by AT&T, Inc. of Dallas, Tex. and running a WINDOWS 7™ operating system as marketed by Microsoft Corporation of Redmond, Wash.; (h.) a GALAXY NEXUS™ smart phone as marketed by Samsung Group of Seoul, Republic of Korea or and running an ANDROID™; (i.) a TOUGHPAD™ tablet computer as marketed by Panasonic Corporation of Kadoma, Osaka, Japan and running an ANDROID™ operating system as marketed by Google, Inc. of Mountain View, Calif.; or (j.) other suitable computational system or electronic communications device known in the art capable of providing or enabling a financial webservice known in the art.

The photo-share webservice server 14 is adapted to enable, and provides to the POS system and/or the mobile device, a photographic document sharing webservice, such as a server adapted to support (a.) FLICKR™ photo sharing webservice provided by Yahoo! of Santa Clara, Calif.; (b.) PICASA™ photo sharing webservice provided by Google, Inc. of Mountain View, Calif.; (c.) SHUTTERFLY™ photo sharing webservice provided by Shutterfly, Inc. of Redwood City; (d.) FACEBOOK™ social networking and photo sharing webservice provided by Facebook, Inc. of Menlo Park, Calif.; or (e.) other suitable photo sharing webservices known in the art.

The retail webservice server 16 may be an element of a retail server network, such as the retail sales network maintained by Amazon.com, Inc. of Seattle, Wash.

Each of the financial services servers 18 & 20 are adapted to support and maintain at least one variety of credit account service, debit account service, and/or monetary value account service, such as (a.) a MACYS retailer credit card service provided by Macy's Corporation of New York, N.Y.: (b.) a VISA™ credit card service provided by Visa, Inc. of Fresno, Del.; (c.) a debit card service as provided by a bank or other financial institution, such as Bank of America of Charlotte, N.C.; or (d.) other financial services account service known in the art.

The retail webservice server 16 and one or more financial service servers 18 & 20 may be or comprise (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f.) an IPHONE™ cellular telephone as marketed by Apple, Inc. of Cupertino, Calif.; (g.) an HTC TITAN II™ cellular telephone as marketed by AT&T, Inc. of Dallas, Tex. and running a WINDOWS 7™ operating system as marketed by Microsoft Corporation of Redmond, Wash.; (h.) a GALAXY NEXUS™ smart phone as marketed by Samsung Group of Seoul, Republic of Korea or and running an ANDROID™; (i.) a TOUGHPAD™ tablet computer as marketed by Panasonic Corporation of Kadoma, Osaka, Japan and running an ANDROID™ operating system as marketed by Google, Inc. of Mountain View, Calif.; or (j.) other suitable computational system capable of providing or enabling a retail webservice known in the art.

The transponder 22 is adapted to bi-directionally communicatively couple the mobile device 8 and the Internet 6. Similarly, the telephony network 7 is adapted to provide bi-directional communications coupling between the mobile device and a plurality of telephony devices (not shown) and the Internet 6.

It is understood that one or more steps or aspects of the invented method may be enabled or provided buy a cloud computing service or asset. The term "cloud computing" as defined and applied within the present disclosure refers to the delivery of computing and data storage capacity as a service enabled by the Internet 6 and often via the World Wide Web. Cloud computing entrusts Internet-accessible services with data, software and computational tasking over the network 4. End users generally access cloud based software applications and computational assets through a web browser or a light weight desktop software program or a mobile software application while the enabling software and data are stored on servers 10, 12, 14, 16, 18, 20 & 22 at a remote location. Commercially available cloud computing services include Windows Azure Platform™ cloud computing platform used to build, host and scale web applications through data centers as provided by Microsoft Corporation of Redmond, Wash. and Amazon Web Services™, also marketed as AWS™ cloud computing platform as provided by Amazon.com of Seattle Wash. and comprising the Elastic Compute Cloud™, also marketed as AMAZON EC2™, scalable computational service and the AMAZON S3™ online data storage web service.

Figure 3:
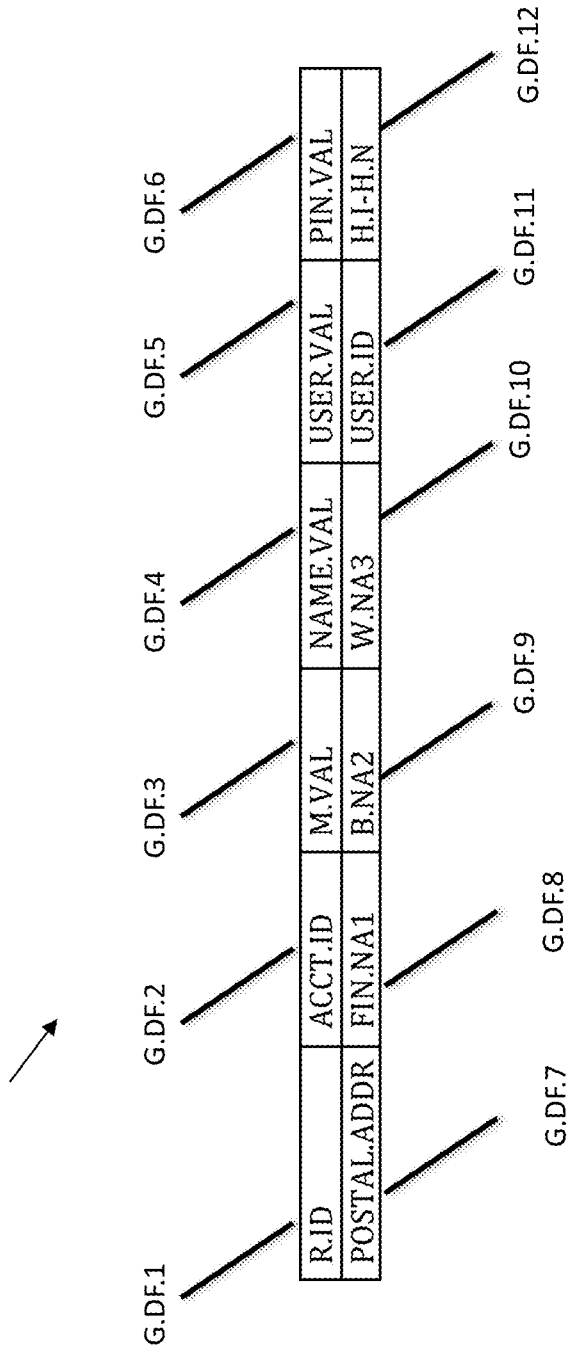
FIG. 3 is a schematic illustration of an exemplary first gift account record that relates the gift card of FIGS. 2A and 2B to account information maintained in the financial account database server of FIG. 2.

Referring now to FIG. 3, FIG. 3 is a schematic illustration of an exemplary first gift account record G.REC.1. It is understood that one or more additional gift account records G.REC.2-G.REC.N may comprise one, some or all of the gift data fields G.DF.1-G.DF.12 and contain information respectively relating to one or more alternate gift accounts.

The first gift data field G.DF.1 includes a record identifier R.ID of the instant gift account record G.REC.1. The second gift data field G.DF.2 contains an account identifier ACCT.ID that uniquely identifies an exemplary first gift account. A third gift account data field G.DF.3 records an adjustable monetary value M.VAL. A fourth gift data field G.DF.4 includes an actual name value NAME.VAL of a person to whom ownership or control of a credit or debit account identified by the instant account identifier ACCT.ID is assigned. It is understood that the actual name value NAME.VAL may be a pseudonym or a name shared by two or more entities. A fifth gift data field G.DF.5 contains a user name value USER.VAL. A sixth gift data field G.DF.6 contains a personal identification number value PIN.VAL. A seventh gift data field G.DF.7 contains a postal address POSTAL.ADDR related to or supplied by a person or entity identified by or associated with the actual name value NAME.VAL contained in the fourth gift data field G.DF.4. An eighth fourth gift data field G.DF.8 includes a first financial services network address FIN.NA1 of a financial services server 18 & 20. A ninth gift data field G.DF.9 includes a benefactor network address B.NA2 of a benefactor who provided the exemplary first gift card account to the beneficiary. A tenth gift data field G.DF.10 includes a web address W.NA3 of a photo sharing webservice server 15. An eleventh gift data field G.DF.7 includes a user identifier USER.ID that identifies, or is associable with, the beneficiary of the exemplary first gift account and/or a network address related to the beneficiary. A twelfth gift history data field G.DF.12 includes history data H.1-H.N related to the instant exemplary first gift account. It is understood that the network addresses FIN.NA1, B.NA2, W.NA3 & DEST.ADDR4 referred to herein may be an email address, a social networking account name address, a small message service address, an account name of the TWITTER™ social networking service, a texting address or a telephone number. It is further understood that the one or more of the contents first gift data field G.DF.1 and the third gift data field G.DF.3 through the twelfth gift data field G.DF.12 may be optional in one or more various preferred embodiments of the invented method.

Figure 4:
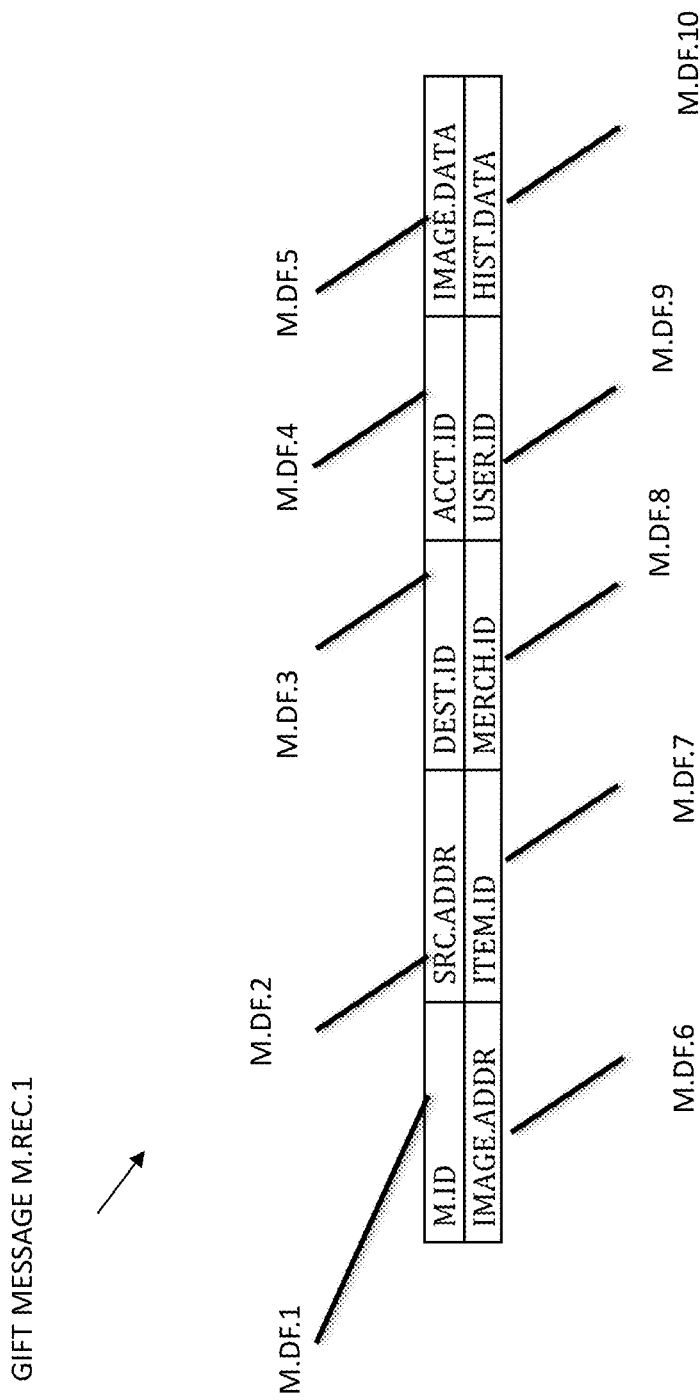
FIG. 4 is a schematic illustration of an exemplary first gift message that is generated in the process of an instant purchase according to one aspect of invented method as enabled by the electronics communications network of FIG. 2.

Referring now to FIG. 4, FIG. 4 is a schematic illustration of an exemplary first gift message M.REC.1 that is generated in the process of an instant purchase according to one aspect of invented method. It is understood that one or more additional gift messages M.REC.2-M.REC.N may comprise one, some or all of the message data fields M.DF.1-M.DF.10 and contain information respectively relating to one or more alternate purchases. The first message data field M.DF.1 includes a message identifier M.ID of the instant gift message M.REC.1. The second message data field M.DF.2 contains a message sender address SRC.ADDR, or source address, that uniquely identifies a network address of an originator of the instant first gift message M.REC.1, i.e. a network address of the POS system 10 or a network address of the mobile device 8. A third gift account data field M.DF.3 specifies a destination address DEST.ADDR of the instant gift message M.REC.1, e.g., a network address the financial server network address FIN.NA1, the benefactor network address B.ADDR, or the photo-share webservice server W.NA3. A fourth message data field M.DF.4 includes the gift account identifier ACCT.ID from which a monetary value is deducted in the execution of the instant purchase. A fifth message data field M.DF.5 includes an image document IMAGE.DATA that relates to an item purchased in the instant purchase, e.g., a digitized photograph of the item purchased or of a generic image of the item purchased. A sixth message data field M.DF.6 includes an image network address IMAGE.ADDR at where a digitized representation of an image related to the instant purchase may be found, e.g., the network address W.ADDR.3 of the photo sharing webservice server 15. A seventh message data field M.DF.7 includes an item identifier ITEM.ID that uniquely identifies the item ITEM.1-ITEM.N purchased in the instant purchase, either generically or by unit-specific identification. It is understood that the purchased item ITEM.1-ITEM.N may be a good or a service, or a license, lease, or permission to use or access a good, service, equipment, locale or venue.

An optional eighth gift history data field M.DF.8 includes merchant identified MERCH.ID that identifies the merchant entity with which the instant purchase was executed. An optional ninth user identifier data field M.DF.9 includes the user identifier USER.ID of the exemplary first gift account record G.REC.1. An optional tenth gift message history data field M.DF.10 includes account information supplied by a user of the instant gift card 2 or instant gift account identified by the account identifier ACCT.ID or read by the POS system 10 or the mobile device 8 directly from the gift card 2, wherein account information may be or include such as (a.) the actual name value NAME.VAL; (b.) the user name value USER.VAL; (c.) personal identification number value PIN.VAL; and/or (d.) the postal address POSTAL.ADDR.

Figure 5:
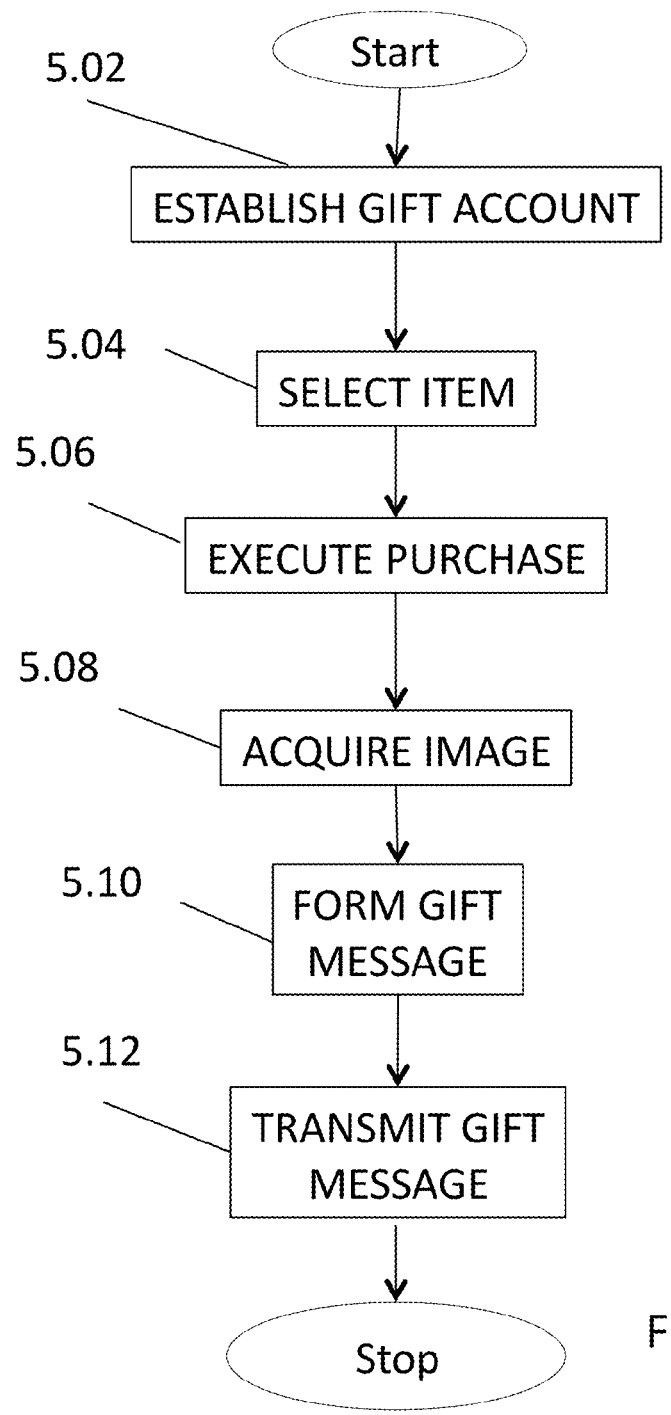
FIG. 5 is a process chart of a first aspect of the invented system as enabled by the communications network of FIG. 2.

Referring now to FIG. 5, FIG. 5 is a process chart of a first aspect of the invented system. In step 5.02 the exemplary first gift account G.REC.1 is established wherein the first gift account record G.REC.1 is created and the gift data fields are populated G.DF.1-G.DF.12. In step 5.04 an item is selected for purchase, and in step 5.06 a purchase of the selected item is executed. In step 5.08 a digitized image representing the purchased item is acquired and the acquired digitized image is inserted into one or more gift message M.REC.1-M.REC.N formed in step 5.10. It is understood that the digitized image representing the purchased item may be generated or provided by the mobile device 8, the POS system 10, or selected from the photo share webservice server 17. In step 5.12 the gift message(s) formed in step 5.10 transmitted to the financial services network address FIN.ADDR.1, the beneficiary address B.NA2 and/or the photo-sharing server address W.ADDR6.

Figure 6:
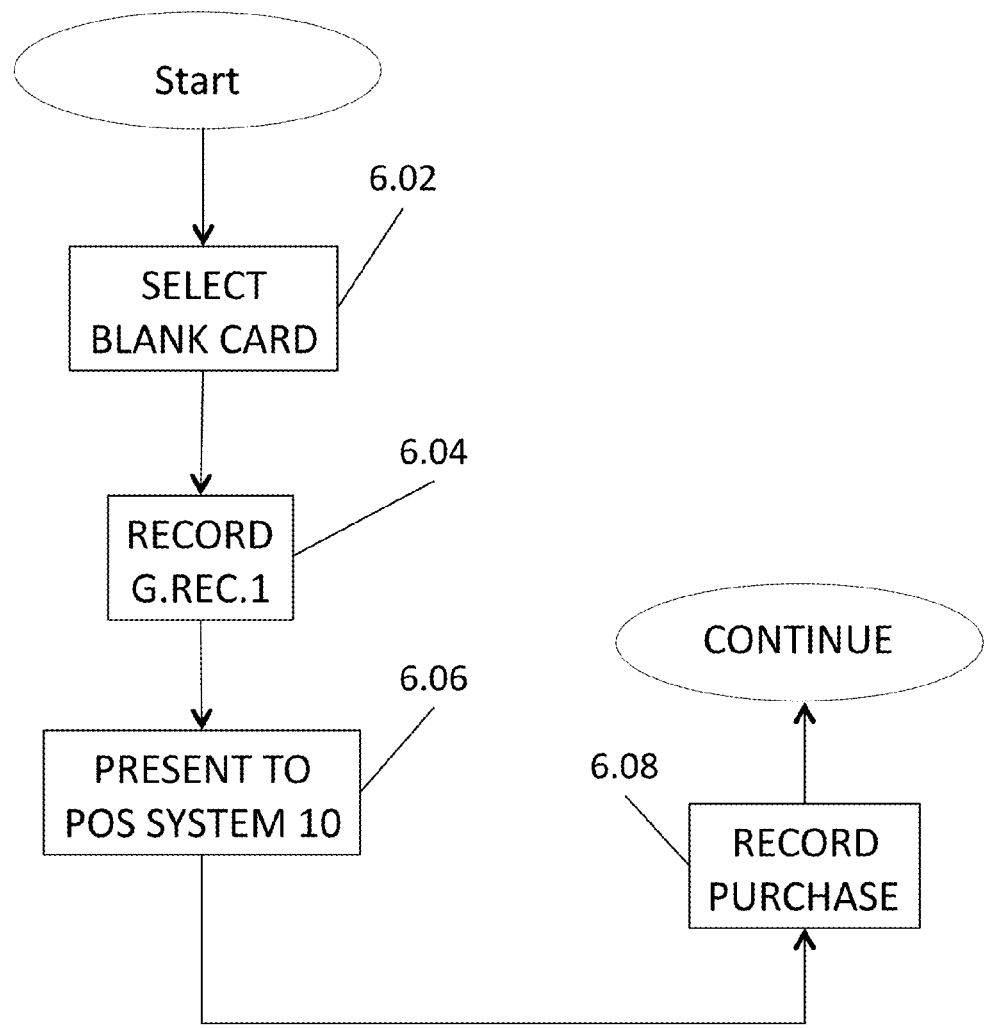
FIG. 6 is a process chart of the interaction of the exemplary first gift card of FIG. 1 with the electronics communications network of FIG. 2.

Referring now to FIG. 6, FIG. 6 is a process chart of the interaction of an exemplary first gift card G.CARD1 within the invented method, wherein the first gift card G.CARD.1 is an instantiation of the gift card 2. In step 6.02 some or all of the data of the exemplary first gift account G.REC.1 is written into an accessible memory of the first gift card G.CARD1, wherein the accessible memory may be or comprise or be comprised within the EMV chip 2.C, the RFID 2.E and/or the magnetic strip 2.G. Furthermore, optionally or additionally in step 6.02 images may be imprinted onto a surface of the first gift card G.CARD1, such as (a.) the QR™ bar code that may include a network address FIN.NA1 of a financial server 18 & 20 (b.) the gift account number 2.B and optionally presenting or comprising the account number of the gift account identifier ACCT.ID; (c.) the hologram 2.C; and/or (d.) the security code 2H, wherein the security code may comprise the personal identifier number PIN.

The first gift card G.CARD1 is presented to the POS system 10 in step 6.06, and the purchase is recorded in the gift card memory G.CARD.M in step 6.08. In step 6.06 the POS system 10 may optionally read certain information from the EMV chip 2.C, the RFID 2.E and/or the magnetic strip 2.G of first gift card G.CARD1, and/or certain other information of the first gift account record G.REC.1 may be supplied by a user of the card to a sales person wherein the sales person manually enters information into the POS system 10 by means of the POS input module 10D. Still optionally or additionally, certain yet other information of the first gift account record G.REC.1 may be supplied by a user of the mobile device 8 by input through the mobile input module 8D and/or access from the mobile memory 8G and transmission through the network 4.

Figure 7:
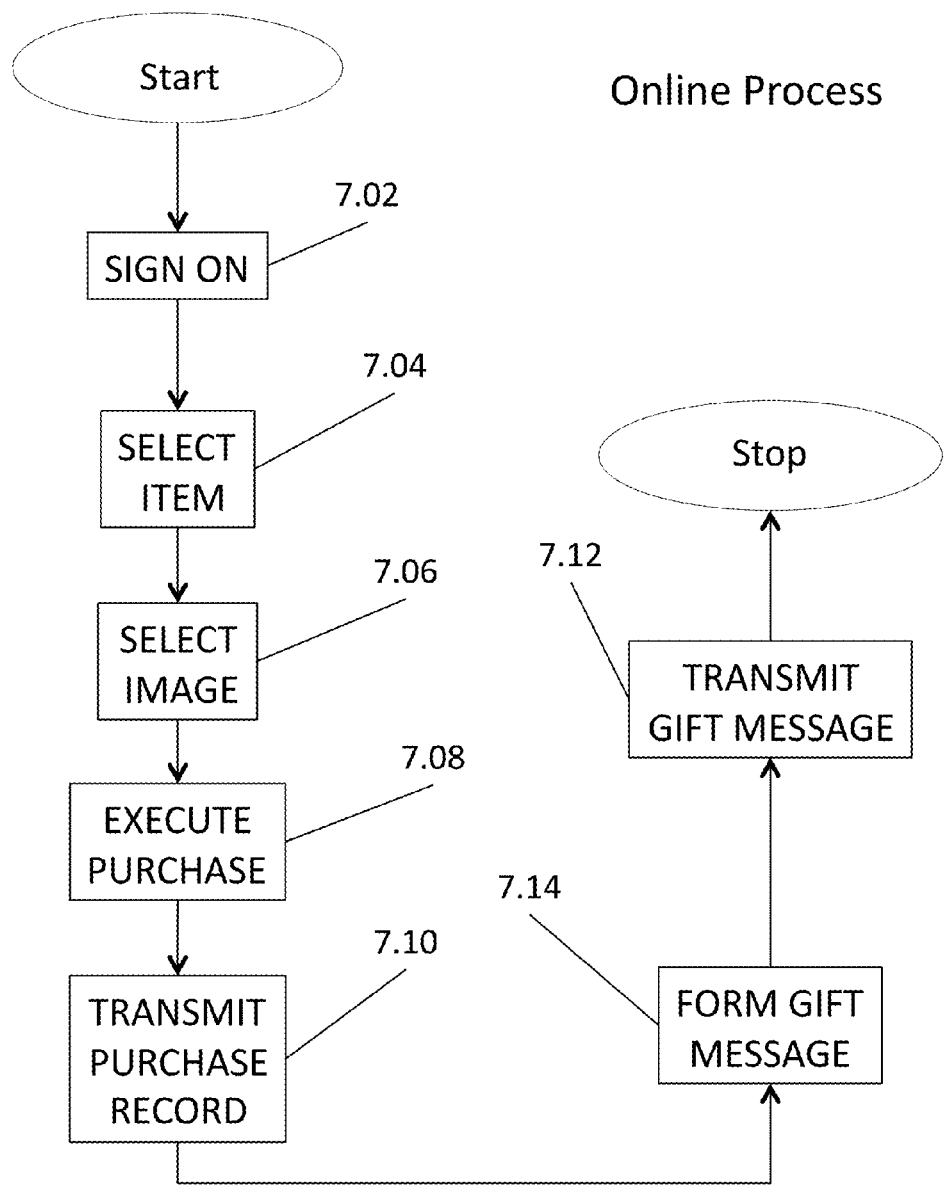
FIG. 7 is a flowchart of another aspect of the present invention applied in an online transaction and performed by either the mobile device or the point of sale system of the electronics communications network of FIG. 2.

Referring now to FIG. 7, FIG. 7 is a flowchart of another aspect of the present invention performed by either the mobile device 8 or the POS system 10. Steps 7.02 through 7.12 will now be discussed as being executed by the POS system 10, yet it is understood that one, some, or all of these steps 7.02 through 7.12 may be executed by the mobile device 8. In step 7.02 the POS system 10 signs onto the network 4 and initiates a purchasing session with the retail webservice server 16. In step 7.04 the POS system 10 receives an item identifier ITEM.ID and selects or receives an image IMAGE.DATA in step 7.07. A purchase of the item corresponding to the selected item identifier ITEM.ID of step 7.04 is executed in step 7.08 in communication with the retail webservice server 16 and with approval by the FAD server 12. A purchase record is transmitted from the POS system 10 to retail webservice server 16 in step 7.10. The exemplary first gift message M.REC.1 is formed and populated with data related to the purchase of step 7.08 in step 7.14, and the first gift message M.REC.1 is transmitted in step 7.12 to the financial services network address FIN.ADDR.1, the beneficiary address B.NA2 and/or the photo-sharing server address W.ADDR5, whereby the digitized image IMAGE.DATA representing the purchased item is addressed for delivery to the benefactor, the photo-share webservice and/or the FAD server 12.

Figure 8:
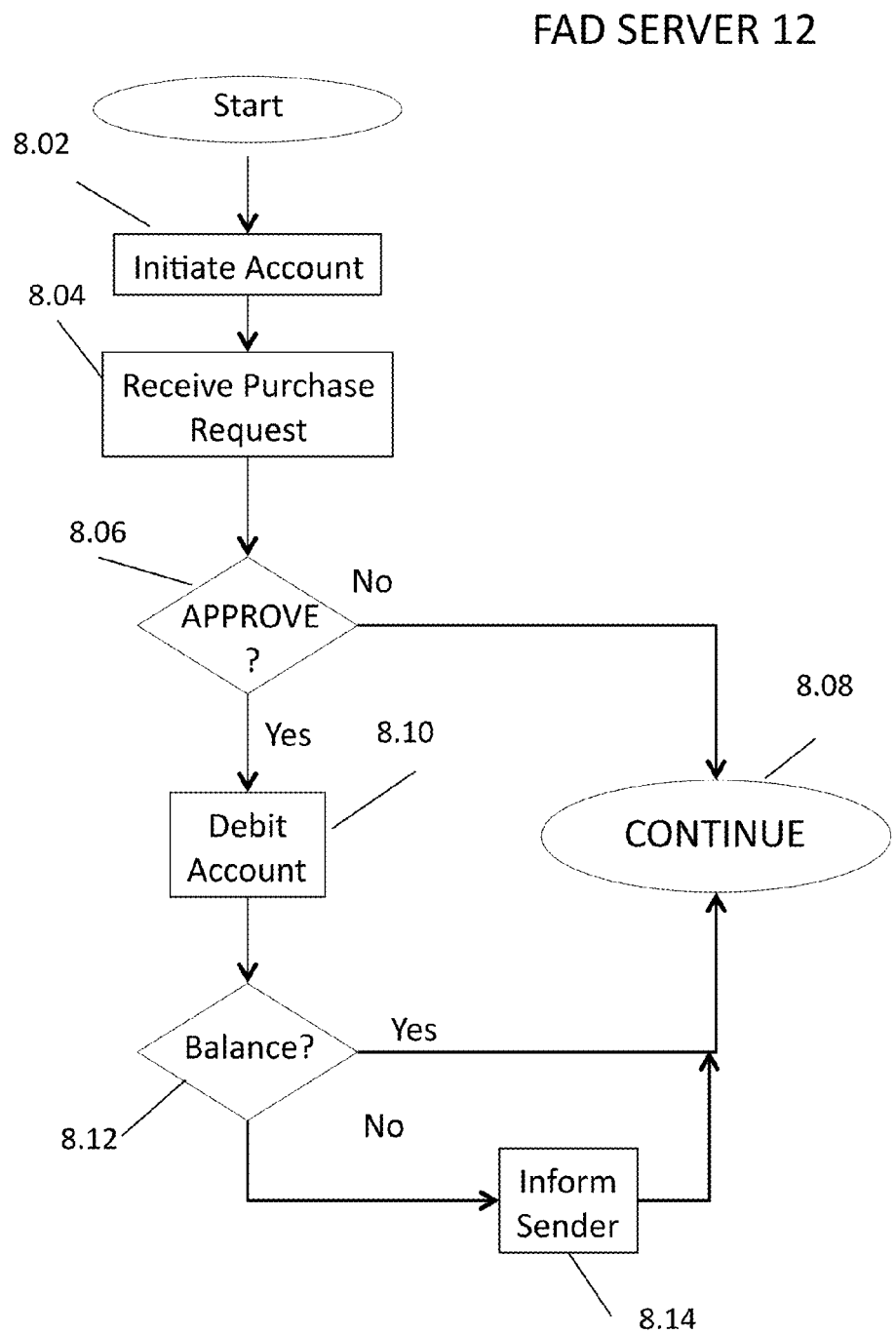
FIG. 8 is a flow chart of the process of the financial account database server of FIG. 2 in accordance with certain aspects of the invented method.

Referring now to FIG. 8, FIG. 8 is a flow chart of the process of the FAD server 12 in accordance with certain aspects of the invented method wherein an item is purchased by and a digitized image representing the item is acquired, online communication over the network 4. The beneficiary initiates an online session with the FAD server 12 over the network 4. In step 8.04 the FAD server 12 receives a purchase request form either the mobile device 8 or the POS system 10. The FAD server 12 determines whether to approve the instant purchase request in step 8.06, and proceeds on to alternate operations in step 8.08 when determining not to accept the instant purchase request received in step 8.05. The FAD server 12 may elect to not accept the instant purchase request in step 8.06 when, for example, valid identifying data related to the beneficiary is not received in step 8.04 or there is not a sufficient monetary balance recorded in the first gift account G.REC.1 to cover the requested purchase. When the FAD server 12 determines to accept the purchase request in step 8.06, the FAD server 12 records the gift account funds debit in the gift account record G.REC.1 in step 8.10. The FAD server 12 determines in step 8.12 if there is a monetary balance left in the instant gift account record G.REC.1 after the funds reduction of step 8.08, and informs the sender when there is no remaining balance in step 8.14. The FAD server 12 proceeds from either step 8.12 or step 8.14 to step 8.08 and to perform alternate computational operations.

Figure 9:
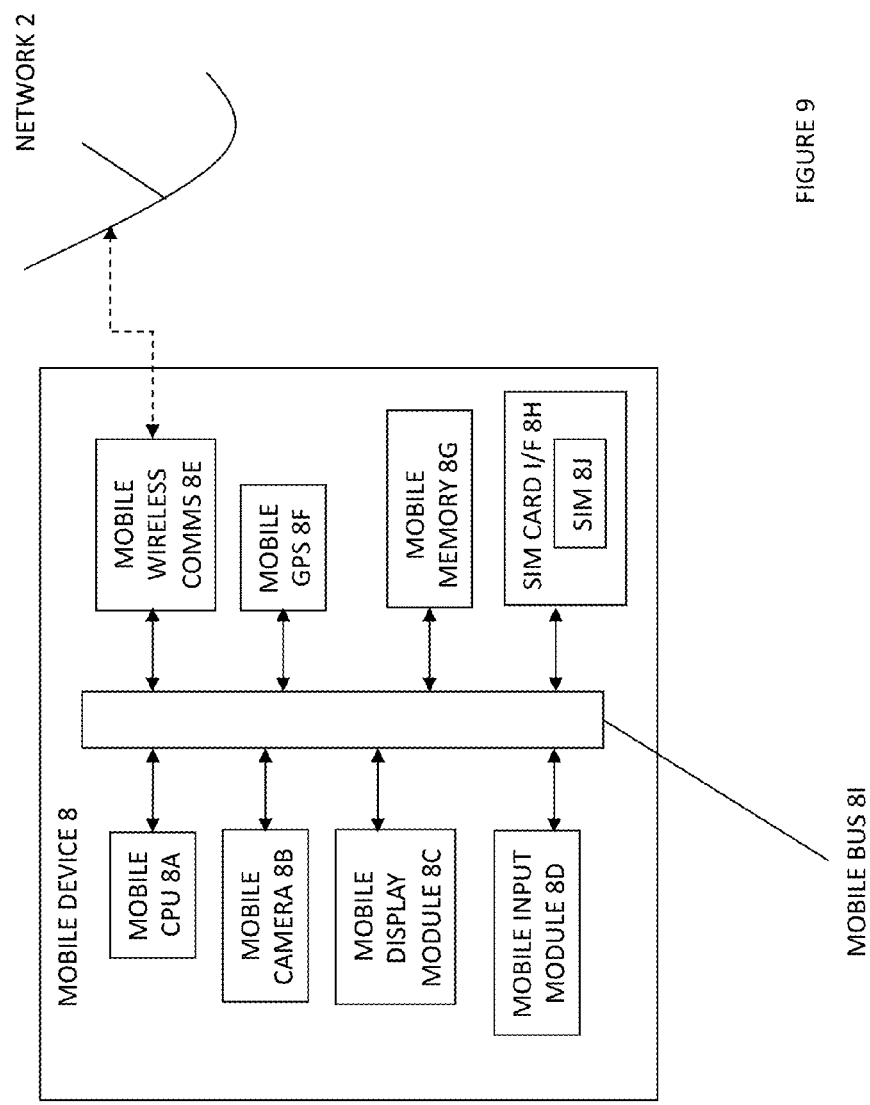
FIG. 9 is a schematic diagram of the mobile device of FIG. 2.

Referring now to FIG. 9, FIG. 9 is a schematic diagram of the mobile device 8. The mobile device includes a central processing unit 8A, a digital camera module 8B, a display module 8C that may include a touch screen enabled for data input, a mobile input module 8D that enables a user to input information into the mobile device 8, a wireless communications module 8E, a mobile global positioning system module 8F, a mobile memory 8G and a SIM card interface module 8H. An internal communications interface 8I enables bi-directional communication between the central processing unit 8A and the digital camera module 8B, the display module 8C, the mobile input module 8D, the wireless communications module 8E, the mobile global positioning system module 8F, the mobile memory 8G and the SIM card interface module 8H. The mobile camera 8B enables a user to generate a digitized photograph of a purchased item or of an image or symbol representing a purchased item. The wireless communications module 8E bi-directionally communicatively couples mobile device 8 to the network 8 by means of wireless communications means and methods. The SIM card interface module 8H individually accepts a plurality of SIM cards 8J, wherein a SIM card 8J is a subscriber identification module provided in accordance with a suitable standard provided by the European Telecommunications Standards Institute.

Figure 10:
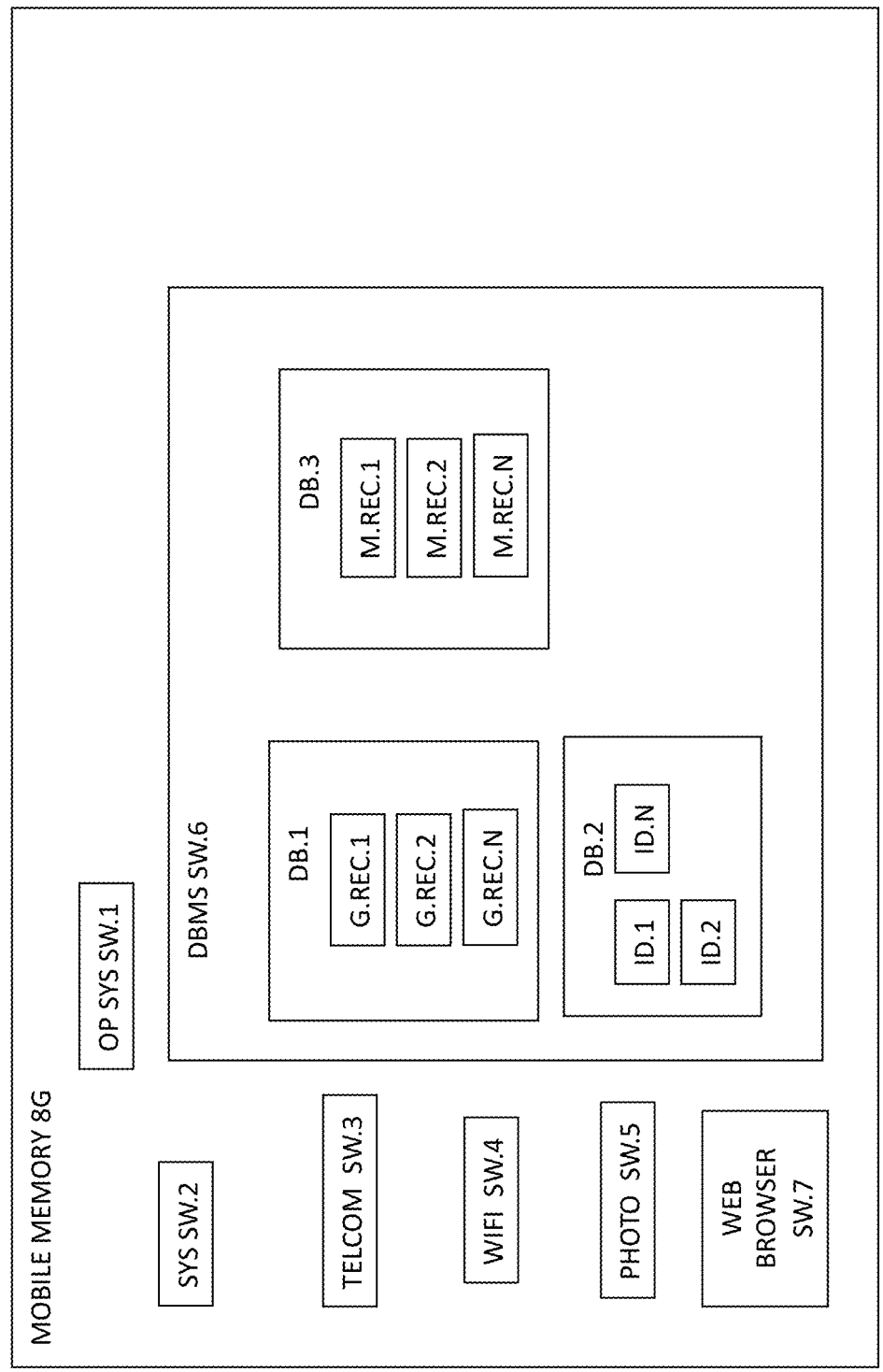
FIG. 10 is a schematic diagram of a mobile memory of the mobile device of FIGS. 2 and 9.

FIG. 10 is a schematic diagram of the mobile memory 8G. The mobile memory 8G stores a mobile device operating system SW.1, a mobile system software SW.2, a TELCOM software SW.3, a Wi-Fi software SW.4, a photographic system software SW.5, a mobile database management system software SW.6, and a web browser SW.7. The mobile operating system software SW.1 enables the mobile device 8 to coordinate and employ the elements 8A-8J of the mobile device 8 in accordance with the invented method. The mobile system software SW.2 enables the mobile device 8 to perform aspects of the invented method as disclosed herein. The TELCOM software SW.3 enables the mobile device 8 to bi-directionally communicate with the telephony network 7. The Wi-Fi software SW.4 enables the mobile device 8 to bi-directionally with the transponder 22 and thereby with the network 4. The photographic software SW.5 enables the mobile device 8 to apply the mobile camera module 8B to generate a digitized photograph of a purchased item and insert the digitized photograph IMAGE.DATA into the fifth message data field M.DF.5 of one or more gift messages M.REC.1-M.REC.N. The mobile database management system software SW.6 includes a plurality of databases DB.1-DB.N that may contain a plurality of gift account records G.REC.1-G.REC.N, a plurality of gift messages M.REC.1-M.REC.N, and a plurality of identification data records ID.1-ID.N. The plurality of identification data records ID.1-ID.N may be used to attest to the identity of the beneficiary when requesting a purchase on the basis of a gift card 2 or a gift account record G.REC.1-G.REC.N.

Figure 11:
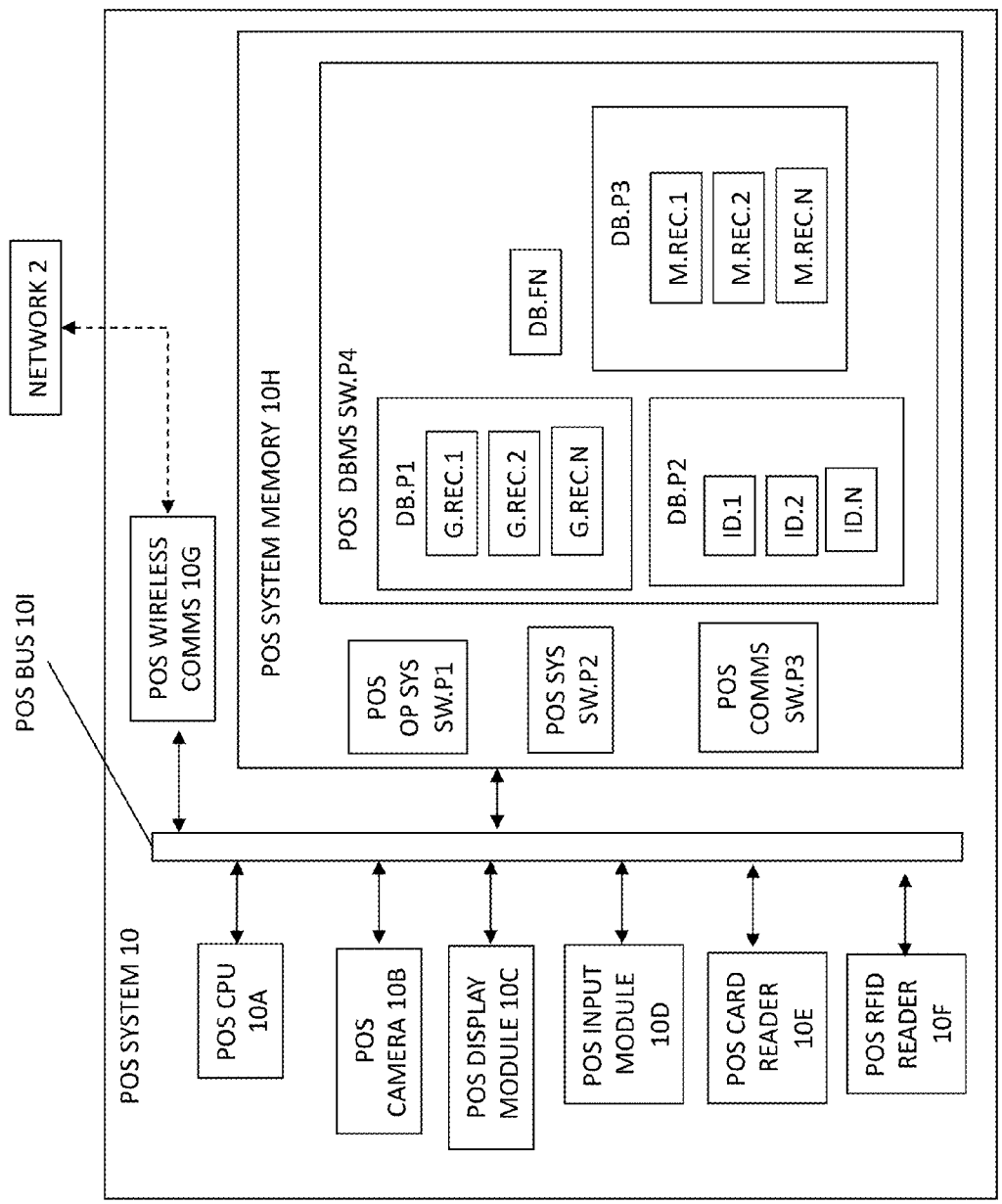
FIG. 11 is a schematic diagram of the point of sale system of FIG. 2.

Referring now to FIG. 11, FIG. 11 is a schematic diagram of the POS system 10. The POS system 10 includes a POS central processing unit 10A, a POS digital camera 10B, a POS output display module 10C that includes a display screen, a POS input module 10D, a POS card reader 10E, a POS RFID reader 10F, a POS wireless communications module 10G, and a POS system memory 10H. The POS central processing unit 10A, the POS digital camera 10B, the POS output display module 10C, the POS input module 10D, the POS card reader 10E, the POS RFID reader 10F, the POS wireless communications module 10G, and the POS system memory 10H are bi-directionally communicatively coupled by a POS internal communications bus 10I. A POS operating system software SW.P1 enables the POS system 10 to coordinate and employ the elements 10A-10I of the POS system 10 in accordance with the invented method. A POS system software SW.P2 enables the POS system 10 to perform aspects of the invented method as disclosed herein. A POS communications software enables the POS network communications module 10G to bi-directionally couple the POS system 10 with the network 4. A POS database management system software SW.P4 includes a plurality of POS databases DB.P1-DB.PN that may contain a plurality of gift account records G.REC.1-G.REC.N, a plurality of gift messages M.REC.1-M.REC.N, and a plurality of identification data records ID.1-ID.N. The plurality of identification data records ID.1-ID.N may be used to attest to the identity of the beneficiary when requesting a purchase on the basis of a gift card 2 or a gift account record G.REC.1-G.REC.N, and include the personal identification number PIN.VAL, the user identifier USER.ID, the security code 2.H of the instant gift card 2, the postal address POSTAL.ADDR, and/or the user name USER.VAL of one or more gift card records G.REC.1-G.REC.N.

Figure 12:
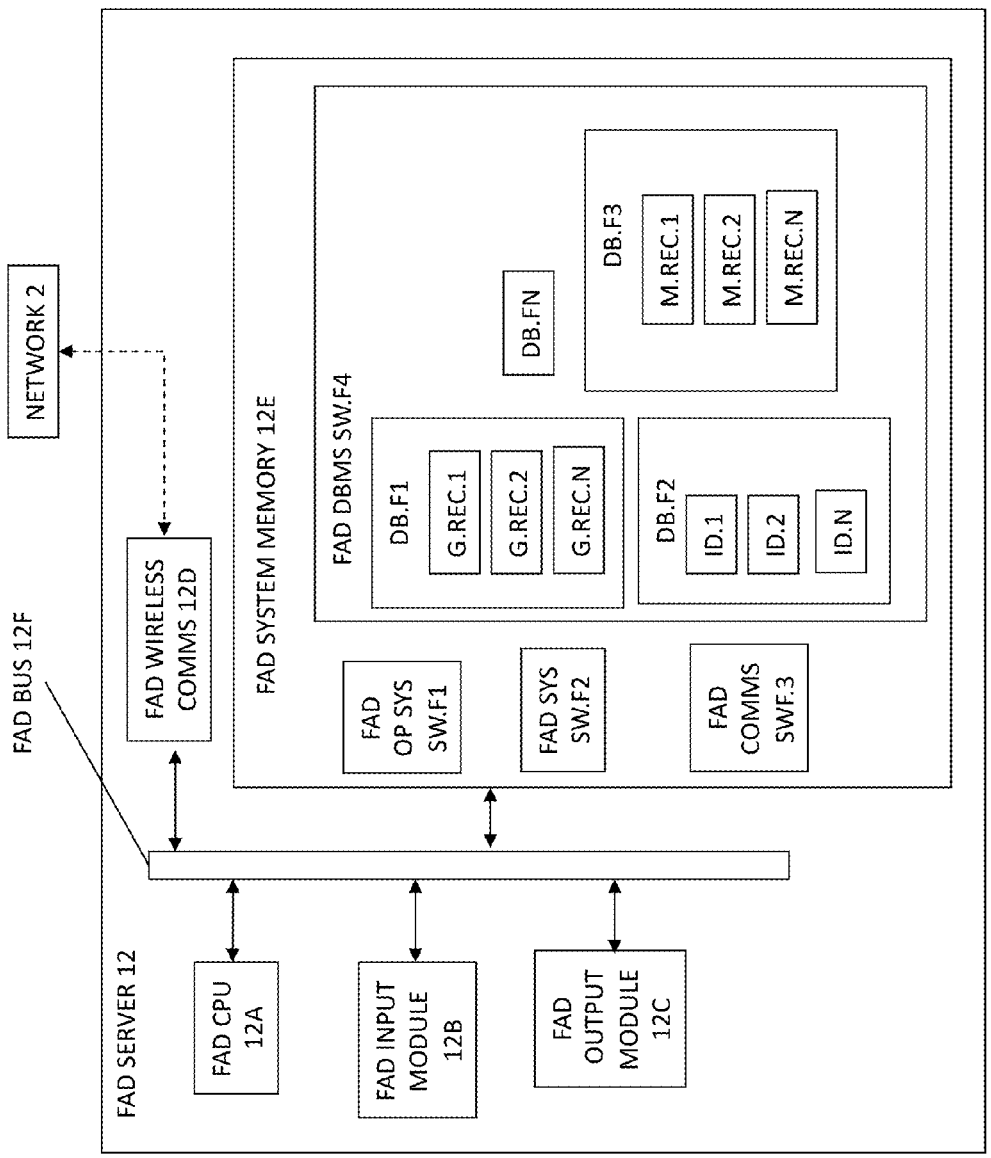
FIG. 12 is a schematic diagram of the financial account database server of FIG. 2.

Referring now to FIG. 12, FIG. 12 is a schematic of the FAD server 12. The FAD server 12 includes a FAD central processing unit 12A, a FAD input module 12B, a FAD output module 12C, a FAD wireless communications module 12D, and a FAD server memory 12E. The FAD central processing unit 12A, the FAD input module 12B, the FAD output module 12C, the FAD wireless communications module 12D, and the FAD server memory 12E are bi-directionally communicatively coupled by a FAD internal communications bus 12F. A FAD operating system software SW.F1 enables the FAD server 12 to coordinate and employ the elements 12A-12I of the FAD server 12 in accordance with the invented method. A FAD server software SW.F2 enables the FAD server 12 to perform aspects of the invented method as disclosed herein. A FAD communications software enables the FAD network communications module 10D to bi-directionally couple the FAD server 12 with the network 4. A FAD database management system software SW.F4 includes a plurality of FAD databases DB.F1-DB.FN that may contain a plurality of gift account records G.REC.1-G.REC.N, a plurality of gift messages M.REC.1-M.REC.N, and a plurality of identification data records ID.1-ID.N. The plurality of identification data records ID.1-ID.N may be used to attest to the identity of the beneficiary when requesting a purchase on the basis of a gift card 2 or a gift account record G.REC.1-G.REC.N.

Figure 13:
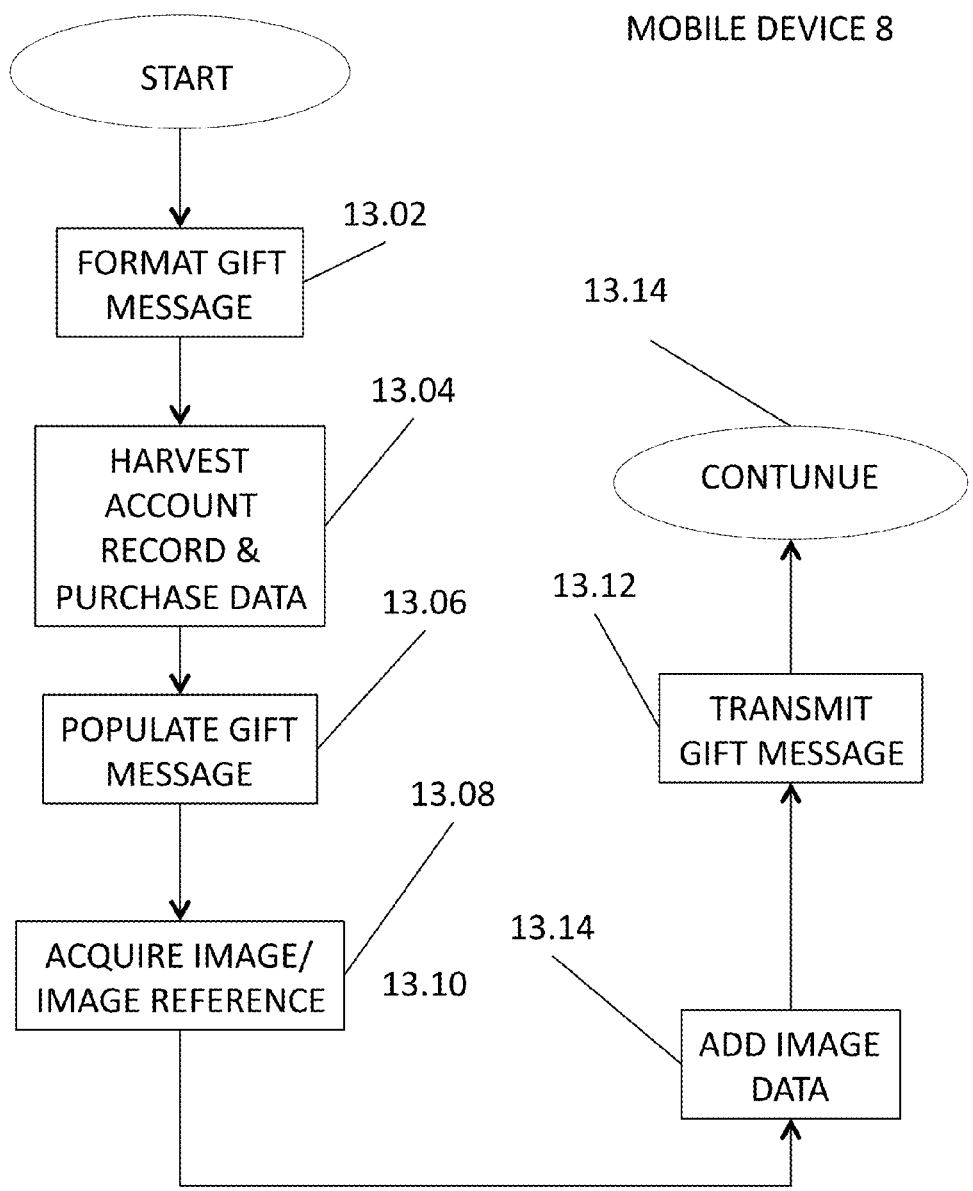
FIG. 13 is a flowchart of an alternate purchase reporting process of the invented method that is executable by the mobile device in communication with the network and the point of sale system of FIG. 2.

Referring now to FIG. 13, FIG. 13 is a flowchart of an alternate purchase reporting process of the invented method that is executable by the mobile device 8 in communication with the network 4 and the POS system 10. The process of FIG. 13 may preferably be initiated after a purchase process effected by access to gift account record G.REC.1-G.REC.N, such as the exemplary first gift card record G.REC.1, has been completed. In step 13.02 the mobile device 8 creates and formats a gift message M.REC.1-M.REC.N, such as the exemplary first gift message M.REC.1. In step 13.04 the mobile device harvests data from the gift card record G.REC.1-G.REC.N selected for and applied in the referenced purchase process. The mobile device 8 then populates the gift message M.REC.1-M.REC.N created in step 12.02 with data harvested from the gift card account record G.REC.1-G.REC.N selected in step 13.04. For example, the benefactor address B.NA2 of the selected gift card record G.REC.1-G.REC.N may be inserted into the instant gift message M.REC.1-M.REC.N as the addressee data DEST.ID. Alternately, the financial services network address FIN.ADDR.1 of the financial services server 18 read from the selected gift card record G.REC.1-G.REC.N may be inserted into the instant gift message M.REC.1-M.REC.N as the addressee data DEST.ID. Additional information, such as the user identifier USER.ID, the gift card account identifier ACCT.ID, and account historical data H.1-H.N may be read into the instant gift message M.REC.1-M.REC.N in step 13.06. Optionally and additionally, an item identifier ITEM.ID may be read into the instant gift message G.REC.1-G.REC.N in step 13.08, wherein the item identifier may be acquired from the POS system 10 and the item identifier ITEM.ID is associated with an item of the purchase process associated with the instant gift message G.REC.1-G.REC.

The mobile device 8 acquires a digitized image of the referenced item, or an image data address that is associated with a digitized image data accessible to the or via network 4, in step 13.08. It is understood that the digitized image data acquired in step 13.08 may include digitized auditory data, digitized visual data, e.g., photographic data or video data, and/or other digitized data that may be rendered to generate sensory displays, i.e., visual images or sound output.

The digitized image data or image data address may, in step 13.08, alternately be (a.) generated by a digital photograph device or a digital camera module of the mobile device 8, the POS system; (b.) read from a mobile memory 8G of the mobile device 8; (c.) uploaded from a digital storage medium, such as a SIM Card 8J; or (d.) downloaded from a photo sharing webservice web 14 or other system or server of the network 4 accessible via the network 1. The digitized image data or image data address is written into the image data field M.DF.5 of the instant gift message M.REC.1-M.REC.N in step 13.14 and the instant gift message M.REC.1-M.REC.N is transmitted via the network 4 to the benefactor address B.ADDR.2, the financial services network address FIN.ADDR.1, or the photo sharing web server address W.NA3 in step 13.12. The mobile device 8 proceeds from step 13.12 and to step 13.14 and to perform alternate computational operations.

Figure 14:
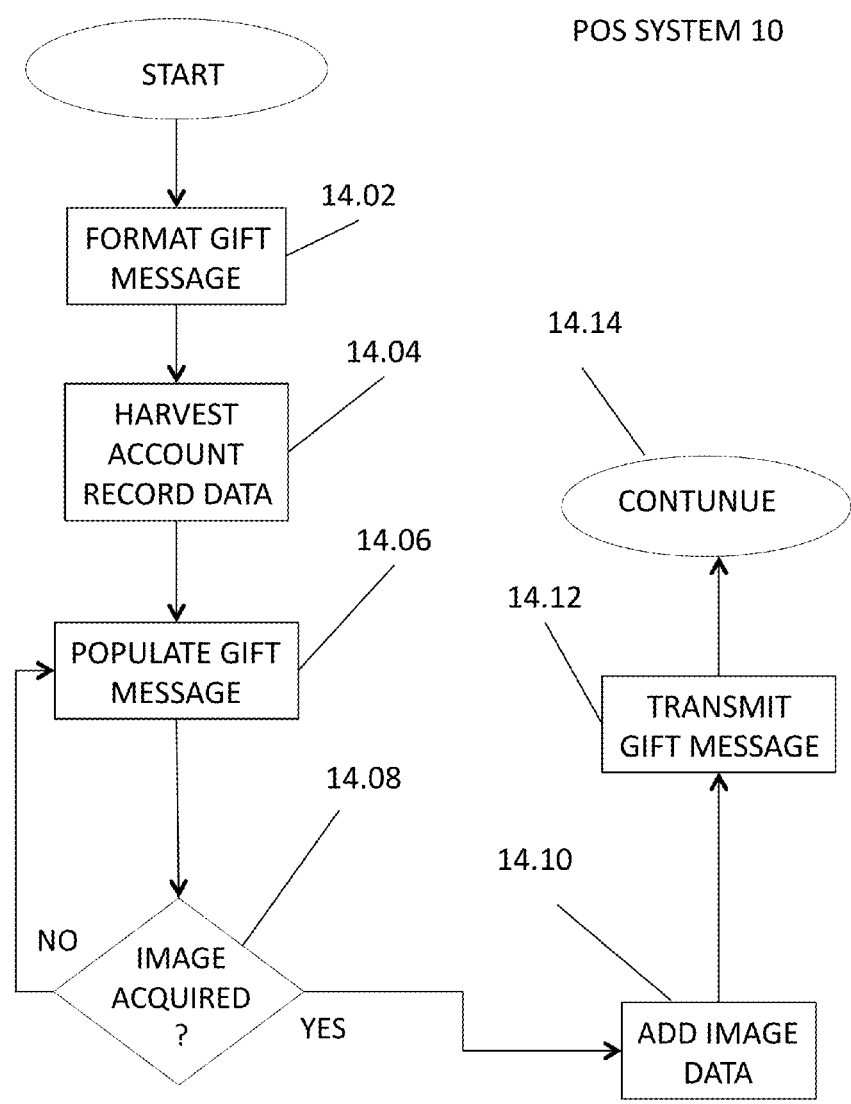
FIG. 14 is a flowchart of an alternate purchase reporting process of the invented method that is executable by the point of sale system in communication with the network and the mobile device of FIG. 2.

Referring now to FIG. 14, FIG. 14 is a flowchart of an alternate purchase reporting process of the invented method that is executable by the POS system 10 in communication with the network 4 and the mobile device 8. The process of FIG. 14 may preferably be initiated after a purchase process effected by access to gift account record G.REC.1-G.REC.N, such as the exemplary first gift card record G.REC.1, has been completed. In step 14.02 the POS system 10 creates and formats a gift message M.REC.1-M.REC.N, such as the exemplary first gift message M.REC.1. In step 14.04 the mobile device harvests data from the gift card record G.REC.1-G.REC.N selected for and applied in the referenced purchase process. The POS system 10 then populates the gift message M.REC.1-M.REC.N created in step 12.02 with data harvested from the gift card account record G.REC.1=G.REC.N selected in step 14.04. For example, the benefactor address B.NA2 of the selected gift card record G.REC.1-G.REC.N may be inserted into the instant gift message M.REC.1-M.REC.N as the addressee data DEST.ID. Alternately, the financial services network address FIN.ADDR.1 of the financial services server 18 read from the selected gift card record G.REC.1-G.REC.N may be inserted into the instant gift message M.REC.1-M.REC.N as the addressee data DEST.ID. Additional information, such as the user identifier USER.ID, the gift card account identifier ACCT.ID, and account historical data H.1-H.N may be written into the instant gift message M.REC.1-M.REC.N in step 14.06. Optionally and additionally, an item identifier ITEM.ID may be read into the instant gift message G.REC.1-G.REC.N in step 14.08, wherein the item identifier may be acquired from the POS system 10 and the item identifier ITEM.ID is associated with an item of the purchase process associated with the instant gift message G.REC.1-G.REC.

The POS system 10 in step 14.08 both (a.) acquires a digitized image of the referenced item, or an image data address that is associated with a digitized image data accessible to the or via network 4; and (b.) determines whether a digitized image or an image data address is actually located or accessed. When the POS system 10 determines in step 14.08 that neither an accessible digitized image nor an image data address has been neither located nor accessed, the POS system 10 returns from step 14.08 to step 14.06.

It is understood that the digitized image data acquired in step 14.08 may include digitized auditory data, digitized visual data, e.g., photographic data or video data, and/or other digitized data that may be rendered to generate sensory displays, i.e., visual images or sound output.

The digitized image data or image data address may, according to step 14.08, alternately be (a.) generated by a digital photograph device or a digital camera module of the mobile device 8, the POS system 10; (b.) read from the system memory 10H of the POS system 10; (c.) uploaded from a digital storage medium, such as a SIM Card 8J; or (d.) downloaded from a photo sharing webservice web 14 or other system or server of the network 4 accessible via the network 1. When the POS system 10 determines in step 14.08 that either an accessible digitized image or an image data address has been located or accessed, the POS system 10 proceeds from step 14.08 to step 14.10.

The digitized image data or image data address is written into the image data field M.DF.5 of the instant gift message M.REC.1-M.REC.N in step 14.10 and the instant gift message M.REC.1-M.REC.N is transmitted via the network 4 to the benefactor address B.ADDR.2, the financial services network address FIN.ADDR.1, or the photo sharing web server address W.NA3 in step 14.12. The POS system 10 proceeds from step 14.12 and to step 14.14 and to perform alternate computational operations.

Figure 15:
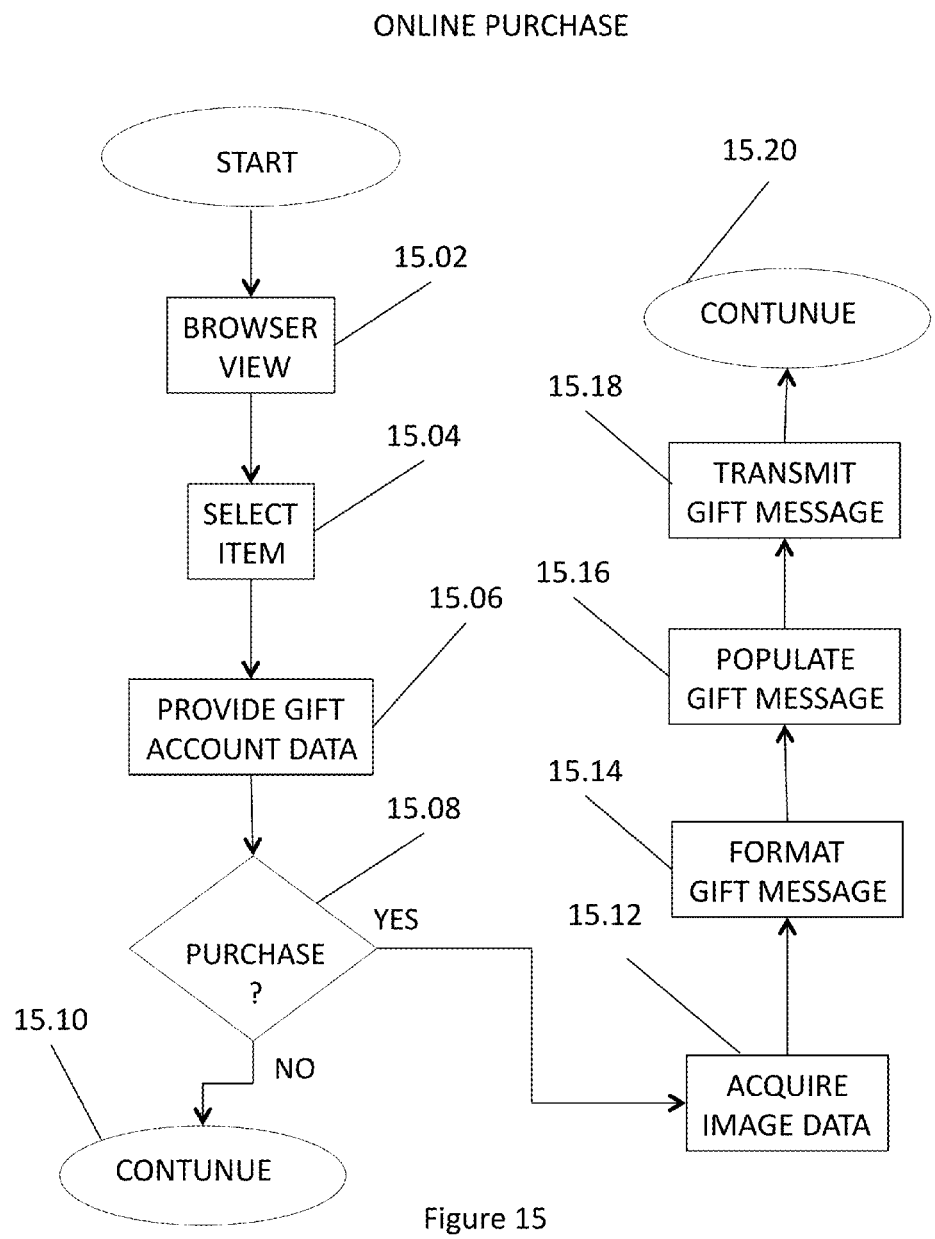
FIG. 15 is a flowchart of an alternate and optional online purchasing process of the invented method that is executable by the mobile device in communication with the network and the retail webservice server of FIG. 2.

Referring now to FIG. 15, FIG. 15 is a flowchart of an alternate and optional online purchasing process of the invented method that is executable by the mobile device 8, or other suitable electronic computational or communications device, in communication with the network 4 and the POS system 10. The user directs a web browser to a retail website maintained by the retail webservice server 16 in step 15.02 and in step 15.04 selects an item for purchase from the webpage rendered by the web browser SW.7 of the mobile device 8. The mobile device 8 provides a gift account record G.REC.1-G.REC.N in step 15,06 to a universal resource locater associated with, indicated by or referenced by the rendered webpage to effect a purchase of the item selected in step 15.04. The mobile device 8 determines in step 15.08 whether the retail webservice server 16 has communicated that a purchase process has been completed. When the mobile device 8 determines in step 15.08 that the retail webservice server 16 has not communicated that a purchase process has been completed, or indicates that a purchase process has failed, the mobile device 8 proceeds from step 15.08 to step 15.10 and to perform alternate computational or communications processes.

Alternately, when the mobile device 8 determines in step 15.08 that the retail webservice server 16 has not communicated that a purchase process has been completed, or indicates that a purchase process has failed, the mobile device 8 proceeds from step 15.08 to step 15.12 and to acquire digitized image data, or an address where digitized image data is located at or accessible from. The mobile device 8 creates an instant gift message M.REC.1-M.REC.N in step 15.14 and populates the instant gift message M.REC.1-M.REC.N in step 15.16 with data either acquired in step 15.12 and/or harvested from the gift account record G.REC.1-G.REC.N of step 15.06. The instant gift message M.REC.1-M.REC.N created is step 15.14 and populated with data in step 15.16 is transmitted via the network 4 in step 15.18. The mobile device 8 proceeds from step 15.18 to step 15.20 and to perform alternate computational or communications processes.

Figure 16:
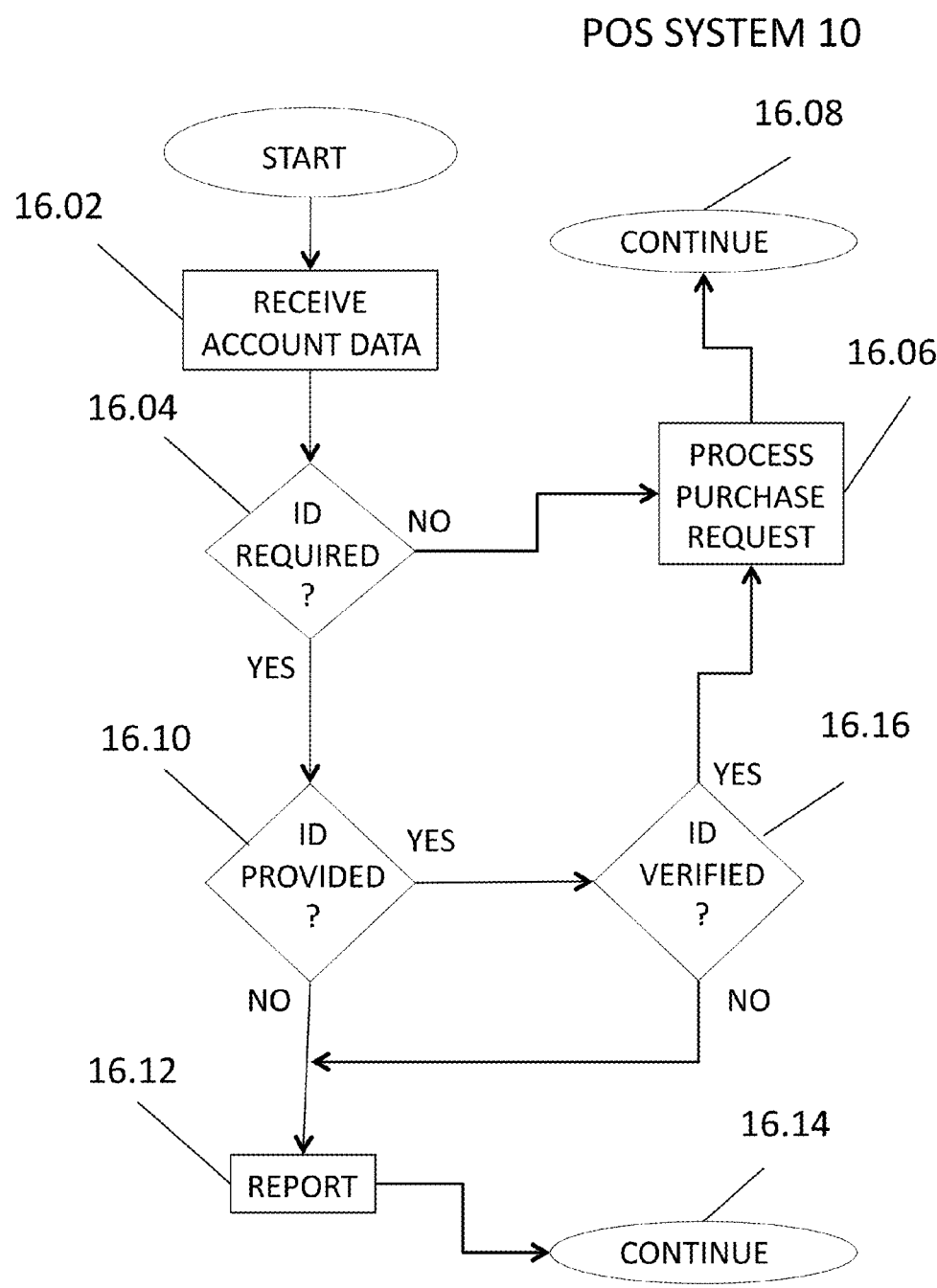
FIG. 16 is a flow chart of a software code executable by the POS system of FIG. 2 imposes one or more optional purchase aspects of the invented method, wherein a user is required to identify himself or herself as authorized to apply a gift account record of FIG. 3.

Referring now to FIG. 16, FIG. 16 is a flow chart of a software code executable by the POS system 10 in communication with the network 4 and the mobile device 8 and wherein the POS system 10 that imposes one or more optional purchase aspects of the invented method, wherein a user is required to identify himself or herself as authorized to apply a gift account record G.REC.1-G.REC.N in order to apply the instant gift card account G.REC.1-G.REC.N. In step 16.02 the POS system 10 receives the instant gift account record G.REC.1-G.REC.N and determines in step 16.04 whether a user authorization information is required by means of user identification or other provision of an authorization data. The required user authentication information may be or include the personal identification number PIN.VAL, the user identifier USER.ID, the security code 2.H of the instant gift card 2, the postal address POSTAL.ADDR, and/or the user name USER.VAL of the instant gift card record G.REC.1-G.REC.N. Alternately or additionally, required user authentication information may include or be information read directly form elements of the card, e.g., the hologram 2.D, the RFID 2.E, the EMV chip 2.C, the QR™ code 2.F, the security code 2.H and/or the magnetic strip 2.G When the POS system 10 determines in step 16.04 that no user authorization is required to permit application of the received gift account record G.REC.1-G.REC.N of step 16.02, the POS system proceeds from step 16.04 to step 16.06 to process a purchase request or an attempted purchase request, and from step 16.06 to step 16.08 and to perform alternate computational processes.

When the POS system 10 determines in step 16.04 that user authorization is required to permit application of the received gift account record G.REC.1-G.REC.N of step 16.02, the POS system proceeds from step 16.04 to step 16.10 and to determine whether the user has provided sufficient identification or authentication data to authorize application of the received gift account record G.REC.1-G.REC.N of step 16.02. When the POS system 10 determines in step 16.10 that the user has not provided sufficient identification or authentication data to authorize application of the received gift account record G.REC.1-G.REC.N of step 16.02, the POS system 10 reports this failure in step 18.12 to one or more financial services servers 18 & 20 and/or the mobile device 8. The mobile device 8 proceeds from step 16.12 to step 16.14 and to perform alternate computational or communications processes.

When the Pos system 10 determines in steps 16.10 16.16 that the user has provided sufficient and verified identification or authentication data to authorize application of the received gift account record G.REC.1-G.REC.N of step 16.02, the POS system proceeds from step 16.16 to step 16.06 to process a purchase request or an attempted purchase request, and from step 16.06 to step 16.08 and to perform alternate computational processes.

The foregoing disclosures and statements are illustrative only of the Present Invention, and are not intended to limit or define the scope of the Present Invention. The above description is intended to be illustrative and not restrictive. Although the examples given herein include many specificities, they are intended as illustrative of only certain possible configurations or aspects of the Present Invention. The examples given should only be interpreted as illustrations of some of the preferred configurations or aspects of the Present Invention and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

What is claimed is:

1. A method of communicating purchases made using a gift card, performed at a server computer of a third party, comprising:
  receiving a request from a benefactor at a remote device to establish a gift card account for a beneficiary, wherein the request includes authorization to fund the gift card account with a designated sum of money;
  in response to the request from the benefactor, creating a gift card account record in a database at the server computer, wherein the gift card account record stores a name of the beneficiary, an account credit equal to the designated sum of money, and an email address for the benefactor;
  receiving a request from the beneficiary to purchase an item using at least a portion of the account credit from the gift card account and receiving a digital image of the item generated or provided by a mobile device of the beneficiary, a point-of-sale system, or a photo sharing web service;
  in response to the request from the beneficiary:
    authorizing the requested purchase; and
    sending a gift message to the benefactor using the benefactor email address stored in the gift card account record, wherein the gift message includes the digital image of the purchased item, includes an identifier of the beneficiary, and indicates that the beneficiary has used credit from the gift card account to purchase the purchased item.

2. The method of claim 1, wherein the digital image represents the item.

3. The method of claim 1, wherein the digital image is acquired by a point of sale system using an image data address accessible by the point of sale system.

4. The method of claim 1, wherein the digital image is acquired by a digital camera of the mobile device of the beneficiary.

5. The method of claim 1, wherein the gift message is sent as an email message.

6. The method of claim 1, wherein the digital image is received with the request from the beneficiary.

7. The method of claim 1, wherein the digital image is received subsequent to receiving the request from the beneficiary.

8. A server computer of a third party for communicating purchases made using a gift card, comprising:
  one or more processors;
  memory; and
  one or more programs stored in the memory configured for execution by the one or more processors, the one or more programs comprising instructions for:
    receiving a request from a benefactor at a remote device to establish a gift card account for a beneficiary, wherein the request includes authorization to fund the gift card account with a designated sum of money;
    in response to the request from the benefactor, creating a gift card account record in a database at the server computer, wherein the gift card account record stores a name of the beneficiary, an account credit equal to the designated sum of money, and an email address for the benefactor;
    receiving a request from the beneficiary to purchase an item using at least a portion of the account credit from the gift card account and receiving a digital image of the item generated or provided by a mobile device of the beneficiary, a point-of-sale system, or a photo sharing web service;
    in response to the request from the beneficiary:
      authorizing the requested purchase; and
      sending a gift message to the benefactor using the benefactor email address stored in the gift card account record, wherein the gift message includes the digital image of the purchased item, includes an identifier of the beneficiary, and indicates that the beneficiary has used credit from the gift card account to purchase the purchased item.

9. The server computer of claim 8, wherein the digital image represents the item.

10. The server computer of claim 8, wherein the instructions for receiving the digital image comprise instructions for acquiring the digital image by a point of sale system using an image data address accessible by the point of sale system.

11. The server computer of claim 8, wherein the instructions for receiving the digital image comprise instructions for acquiring the digital image by a digital camera of the mobile device of the beneficiary.

12. The server computer of claim 8, wherein the instructions for sending the gift message comprise instructions for sending the gift message as an email message.

13. The server computer of claim 8, wherein the instructions for receiving the digital image and the instructions for receiving the request from the beneficiary comprise instructions for receiving the digital image with the request from the beneficiary.

14. The server computer of claim 8, wherein the instructions for receiving the digital image comprise instructions for receiving the digital image subsequent to receiving the request from the beneficiary.

15. A non-transitory computer readable storage medium storing one or more programs configured for execution by a server computer of a third party having one or more processors and memory storing one or more programs configured for execution by the one or more processors, the one or more programs comprising instructions for:
  receiving a request from a benefactor at a remote device to establish a gift card account for a beneficiary, wherein the request includes authorization to fund the gift card account with a designated sum of money;

in response to the request from the benefactor, creating a gift card account record in a database at the server computer, wherein the gift card account record stores a name of the beneficiary, an account credit equal to the designated sum of money, and an email address for the benefactor;

receiving a request from the beneficiary to purchase an item using at least a portion of the account credit from the gift card account and receiving a digital image of the item generated or provided by a mobile device of the beneficiary, a point-of-sale system, or a photo sharing web service;

in response to the request from the beneficiary:
authorizing the requested purchase; and
sending a gift message to the benefactor using the benefactor email address stored in the gift card account record, wherein the gift message includes the digital image of the purchased item, includes an identifier of the beneficiary, and indicates that the beneficiary has used credit from the gift card account to purchase the purchased item.

16. The non-transitory computer readable storage medium of claim 15, wherein the digital image represents the item.

17. The non-transitory computer readable storage medium of claim 15, wherein the instructions for receiving the digital image comprise instructions for acquiring the digital image by a point of sale system using an image data address accessible by the point of sale system.

18. The non-transitory computer readable storage medium of claim 15, wherein the instructions for receiving the digital image comprise instructions for acquiring the digital image by a digital camera of the mobile device of the beneficiary.

19. The non-transitory computer readable storage medium of claim 15, wherein the instructions for sending the gift message comprise instructions for sending the gift message as an email message.

20. The non-transitory computer readable storage medium of claim 15, wherein the instructions for receiving the digital image and the instructions for receiving the request from the beneficiary comprise instructions for receiving the digital image with the request from the beneficiary.

21. The non-transitory computer readable storage medium of claim 15, wherein the instructions for receiving the digital image comprise instructions for receiving the digital image subsequent to receiving the request from the beneficiary.

* * * * *

UNITED STATES PATENT AND TRADEMARK OFFICE
CERTIFICATE OF CORRECTION

PATENT NO. : 9,928,503 B2
APPLICATION NO. : 13/481768
DATED : March 27, 2018
INVENTOR(S) : Leeds et al.

Page 1 of 1

It is certified that error appears in the above-identified patent and that said Letters Patent is hereby corrected as shown below:

On the Title Page

In the Abstract (57), Column 2 Line 9, please delete "record of at least" and insert --record at least--.

Signed and Sealed this
Twenty-second Day of May, 2018

Andrei Iancu
*Director of the United States Patent and Trademark Office*